United States Patent [19]

Schulz et al.

[11] 3,933,987

[45] Jan. 20, 1976

[54] SIMULTANEOUS PRODUCTION OF CHLORINE DIOXIDE AND A SALT OF A STRONG ACID

[75] Inventors: Arthur C. Schulz, North Tonawanda; Herbert J. Rosen, Yonkers, both of N.Y.

[73] Assignee: Hooker Chemicals & Plastics Corporation, Niagara Falls, N.Y.

[22] Filed: Sept. 17, 1970

[21] Appl. No.: 72,941

Related U.S. Application Data

[63] Continuation-in-part of Ser. No. 589,114, Oct. 24, 1966, abandoned.

[52] U.S. Cl. .................................. 423/478; 423/552
[51] Int. Cl.² ........................................ C01B 11/02
[58] Field of Search ........ 23/152, 121, 87; 423/478, 423/552

[56] References Cited
UNITED STATES PATENTS

| | | | |
|---|---|---|---|
| 2,317,443 | 4/1943 | Cunningham | 23/152 |
| 2,598,087 | 5/1952 | Wayman et al. | 23/152 |
| 2,811,420 | 10/1957 | Pernert | 23/152 |
| 2,863,722 | 12/1958 | Rapson | 23/152 |
| 3,341,287 | 9/1967 | Scribner | 23/152 |
| 3,341,288 | 9/1967 | Partridge et al. | 23/152 |
| 3,347,628 | 10/1967 | Sepall et al. | 23/152 X |
| 3,563,702 | 2/1971 | Partridge et al. | 23/152 X |

FOREIGN PATENTS OR APPLICATIONS

| | | | |
|---|---|---|---|
| 668,191 | 12/1965 | Belgium | 23/152 |

*Primary Examiner*—Earl C. Thomas
*Attorney, Agent, or Firm*—Peter F. Casella; William J. Crossetta, Jr.

[57] ABSTRACT

A process for the production of chlorine dioxide, chlorine and an inorganic salt comprising reacting an aqueous solution of a chlorate with hydrochloric acid under reduced pressure at a temperature near the boiling point of said solution, withdrawing produced chlorine dioxide, chlorine and water vapor from said solution, replenishing said solution with an additional amount of chlorate and acid, saturating said solution with a cation of said chlorate and an anion of said acid and crystallizing in said solution, a salt of the cation of the chlorate and the anion of the said acid.

7 Claims, 1 Drawing Figure

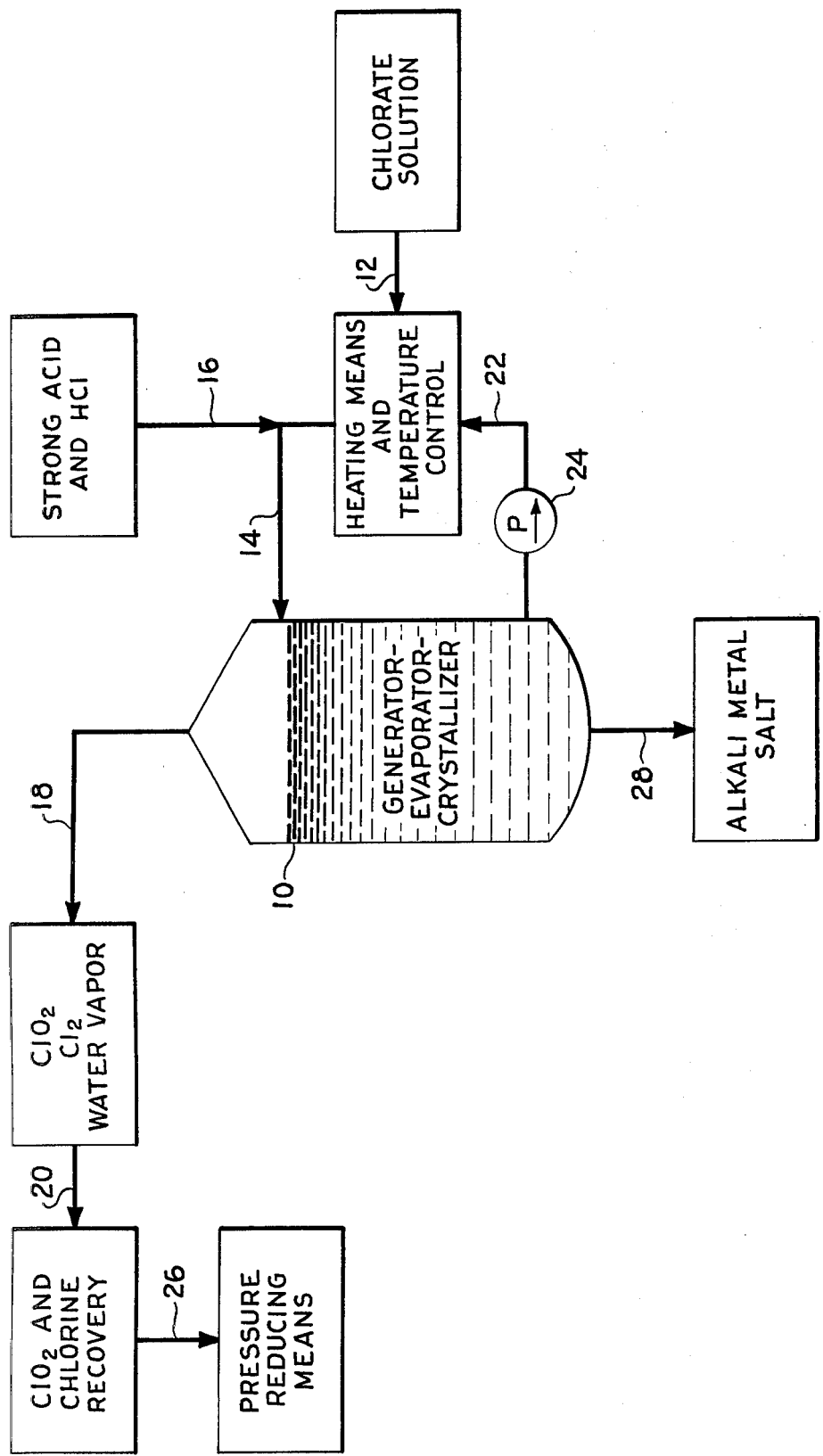

SIMULTANEOUS PRODUCTION OF CHLORINE DIOXIDE AND A SALT OF A STRONG ACID

REFERENCE TO RELATED APPLICATIONS

This application is a continuation-in-part of Ser. No. 589,114, filed Oct. 24, 1966, and now abandoned.

This invention relates to the production of chlorine dioxide, chlorine and an inorganic salt of a strong mineral acid by a novel process utilizing a combination generator-evaporator-crystallizer. More particularly, the present invention relates to a process for producing chlorine dioxide while simultaneously producing and crystallizing under the same reaction conditions a salt of the strong acid used, while controlling the amount and type of salt crystallized.

Numerous processes are known for the production of chlorine dioxide by the reaction of a chlorate with a reducing agent in the presence of a strong acid. Many of these processes have particularly desirable advantages but are usually attended by certain disadvantages. Even many of the more desirable processes result in the production of excessive amounts of by-products which frequently cannot be economically recovered or used. For instance, in the bleaching of wood pulp, although some of the strong acid by-product from chlorine dioxide generating processes can be used for the manufacture of tall oil, numerous pulping operations do not result in the production of tall oil and in these instances, the excess acid must be either wasted or recovered by additional expensive operations.

Another by-product of many chlorine dioxide processes is sodium sulfate or another metal sulfate salt. This salt previously could only be recovered from solution in acidic by-product streams by complex and expensive methods. Sodium sulfate can be used to make up wood pulp digestion liquors but only to the extent needed to make up losses of sodium and sulfur in the pulp cooking process. Modern bleaching processes have less and less loss of sodium and sulfur (to minimize air and stream pollution) and hence the requirements for sodium sulfate make-up are decreasing. This leaves a net excess of sodium sulfate from many chlorine dioxide processes.

Therefore, it has become highly desirable to provide a method for generating chlorine dioxide in a manner whereby the amount of by-products produced can be controlled on a day-to-day basis to suit the best economics of the bleach mill while providing a convenient and simplified method for recovering the desired amount of such by-products.

It is an object of the present invention to provide a method for producing chlorine dioxide wherein the amount of metal salt produced and the type thereof can be controlled in the process on a day-to-day basis. It is another object of this invention to provide a novel method of producing chlorine dioxide while simultaneously recovering under the same reaction conditions, a metal salt of the strong acid from the chlorine dioxide generating solution. A further object of the present invention is to provide a method whereby chlorine dioxide can be produced while reducing the amount of strong acid required and eliminating the effluent stream of waste acid values. Yet another object of the present invention is to provide a simplified method for recovering an inorganic salt of the strong acid while eliminating the need for refrigeration and/or other auxiliary concentrating and crystallizing equipment. These and other objects will become apparent to those skilled in the art from the description of the invention which follows.

In accordance with this invention, there is provided an improvement on a continuous process for the production of chlorine dioxide, chlorine and an inorganic salt wherein a reducing agent is continuously introduced into an aqueous reaction solution maintained from about 1–12 normal in mineral acid and from 0.005 to about 3.5 molar in chlorate at a temperature between about 30° to about 90° centigrade to produce chlorine dioxide and a solid inorganic salt, the improvement which comprises conducting said continuous process by introducing hydrochloric acid as the reducing agent into a unilocular vessel containing said reaction solution under reduced pressure of from 50 to about 600 millimeters mercury absolute, wherein said pressure is coordinated with the temperature of the reaction solution to effect the evaporation of water from said aqueous reaction solution at a rate sufficient to maintain a substantially constant volume of reaction solution, whereby chlorine dioxide and chlorine are continuously generated and removed from said vessel in admixture with said evaporated water and said inorganic salt is crystallized from said aqueous reaction solution in said unilocular vessel and recovered.

The process of this invention provides for the production of chlorine dioxide, chlorine, a smaller amount of sulfate salt than is produced when sulfuric acid is employed as the mineral acid in conjunction with a metal chloride reducing agent and results in no acid effluent from the unilocular generator-evaporator-crystallizer vessel. Thus, only desired products, utilizeable in bleaching operations are produced without the acid effluent disposal problem and consequent pollution of surface water which attends the operation of conventional chlorine dioxide generating systems of the commercial art.

By the expression — unilocular vessel — applicants mean a vessel containing one chamber free from internal zoneing structure within its envelope. The process steps involving the generation of chlorine dioxide, chlorine, formation of a solid inorganic salt and the evaporation of water from the reaction solution, all occur within the same solution, at the same site within the unilocular vessel, the necessary reactants being continuously introduced into the reaction solution and the gaseous products of reaction being continuously withdrawn in admixture with water vapor while the solid inorganic salt simultaneously and continuously separates from the reaction solution.

The present invention overcomes numerous difficulties of prior art processes while incorporating a wide degree of flexibility in the amount of salt produced in the process and the type of salt produced thereby. Further, the process provides a method for simultaneously generating chlorine dioxide and crystallizing the desired salt under the same reaction conditions in an amount commensurate with the needs of a particular total bleaching process. The greatly improved economics of such process is immediately apparent from the description herein and the simplicity thereof satisfies a long felt need in the art.

The invention will be described more fully by reference to the drawing which is a partial schematic and flow sheet of the present invention.

The present invention may utilize any chlorate salt as the source of the generated chlorine dioxide. However, metal chlorates, particularly alkali metal chlorates, such as sodium, potassium, lithium, rubidium and cesium and alkaline earth metals such as calcium and magnesium are most commonly used. Of these, sodium chlorate is preferred because of its ready availability commercially and its normally lesser cost. Therefore, the invention, as more fully described herein, will be directed more particularly to sodium chlorate as the chlorate salt. However, it is recognized that in place of sodium chlorate, other inorganic chlorates can be utilized to obtain correspondingly good results.

Through the use of hydrochloric acid as the reducing agent for conversion of a chlorate to chlorine dioxide and chlorine in acidic aqueous medium, the amount of cation present in the reaction solution may be controlled to increase or decrease the amount of inorganic salt produced. Thus, where sulfuric acid is employed as the mineral acid and hydrochloric acid is employed as the sole reducing agent, an amount of metal sulfate or bisulfate will be produced, depending upon the average acidity of the reaction solution, corresponding to the amount of metal chlorate supplied to the reaction solution. When an increased production of the sulfate salt is desired, a portion of the reducing agent introduced into the reaction solution may be in the form of a metal chloride salt. The additional cation concentration increases the amount of insoluble metal sulfate.

When an amount of sulfate salt is desired which is less than the amount produced in the process employing sulfuric acid as the mineral acid and hydrochloric acid in stoichiometric amount to serve solely as a reducing agent, the amount of hydrochloric acid in the reaction solution may be increased so that the hydrochloric acid serves a dual function as a reducing agent and as a portion of the mineral acid. Thus, by proper control of the acids in the reaction solution, a mixed inorganic salt product may be prepared which is composed of a metal chloride and a metal sulfate. These salts are readily separable, based upon their solubility in water. The mixed chloride-sulfate salt may be used directly to provide the Na and S values for the chemical recovery system of the pulp mill. Likewise, the mixed chloride-sulfate salt product may be recovered, stored and reused in chlorine dioxide production as the source of a reducing agent and to recover any acid values in the bisulfate salt form at a subsequent period of greater demand for the neutral sulfate salt.

The chloride used as a supplemental reducing agent can be any metal chloride such as the alkali metal or alkaline earth metals named above. However, when a chloride is used as a partial replacement for hydrogen chloride, it is normally preferred to use a chloride salt having a cation corresponding to the cation of the chlorate. In most instances, the chloride salt is an alkali metal chloride such as sodium chloride. Therefore, the invention will be described more fully with respect to the use of sodium chloride as the chloride salt. However, it is recognized that other inorganic chlorides can be used in the same manner to obtain correspondingly good results.

The strong mineral acid utilized in this invention may be any strong acid other than HCl, such as sulfuric, phosphoric and chloric acid. Sulfuric acid is normally the preferred strong mineral acid for commercial use because of its ready availability, low cost and the usual desirability to utilize a sulfate salt in other related bleaching and pulping processes. Therefore, the invention will be described more particularly with reference to the use of sulfuric acid as the supplemental strong acid. However, it is recognized that other strong acids can be used with correspondingly good results to thereby obtain the corresponding salt of the strong acid.

The primary reaction involved in the present chlorine dioxide generating process is represented by the equation:

(1) $ClO_3^- + Cl^- + H^+ \rightarrow ClO_2 + \frac{1}{2} Cl_2 + H_2O$

When the chloride ion is supplied solely as hydrogen chloride and sulfuric acid is used as the strong mineral acid, the amount of sulfate produced is equal to about one-half of that produced when all of the chloride ion is supplied as a metal chloride. Because it is desirable to reduce the amount of sulfate salt formed to that commensurable with the demand in a given pulping operation, the process normally has chloride ion supplied as hydrogen chloride in the range of 5 to 100 per cent of the chloride ion requirement. The reaction thus proceeds primarily according to equation (2) As the amount of chloride ion supplied as metal chloride increases, the amount of sodium sulfate by-product is correspondingly increased according to equation (3). When HCl is used as the reducing agent and to supply the acidity of the strong mineral acid, a chloride salt is produced rather than a sulfate salt according to equation (4).

(2) $2NaClO_3 + 2HCl + H_2SO_4 \rightarrow 2ClO_2 + Cl_2 + Na_2SO_4 + 2H_2O$
(3) $2NaClO_3 + 2NaCl + 2H_2SO_4 \rightarrow 2ClO_2 + Cl_2 + 2Na_2SO_4 + 2H_2O$
(4) $2NaClO_3 + 4HCl \rightarrow 2ClO_2 + Cl_2 + 2NaCl + 2H_2O$ When the reaction is run in accordance with equation (4) the reaction is preferably run at the higher temperature described herein wherein the chlorate is more soluble than the chloride salt thus eliminating crystallizing the chlorate salt with the chloride salt when operating at a high chlorate concentration. The chloride salt recovered can be returned to an electrolytic process for the production of more chlorate.

In the present invention, when using sulfuric acid, the chloride used acts as a reducing agent. The chloride used in the process is preferably hydrogen chloride which can be supplemented with a metal chloride to control the yield of metal sulfate salt. The hydrogen chloride is used in gaseous or aqueous form, such as anhydrous HCl, aqueous hydrochloric acid, or a combination thereof. When sodium chloride is used as part of the chloride, it is used to replace that amount of the HCl reducing agent sufficient to increase the metal cation concentration of the reaction solution and the amount of inorganic salt produced up to about 95 percent of the hydrogen chloride. By varying the amount of sodium chloride utilized in the process as the reducing agent, and substituting, therefore, hydrogen chloride, the amount of alkali metal salt produced can be reduced by as much as about 50 per cent. Such a reduction is highly desirable in pulping operations wherein water pollution abatement controls are pursued such as those which result in the recovery of large amounts of sulfate waste for recycle in the pulping process.

In considering the use of hydrogen chloride as a reducing agent, one skilled in the art would expect that it would be inoperable because of the high vapor pressure of hydrogen chloride in aqueous solutions, particularly under the present conditions of reaction near the boiling point of the solution. However, under the operating conditions, and in the concentrations utilized, it has been found that hydrogen chloride can be successfully utilized without the expected loss through volatilization to achieve an unexpectedly good and desirable method of operation. Hydrogen chloride losses can be almost entirely eliminated, especially by utilizing certain techniques in adding the chloride to the reaction generator. When gaseous HCl is used, it is preferred to bubble the gas into the reaction mixture in the generator below the liquid surface. Another method is to mix the HCl with the reaction solution prior to subjecting it to the reduced pressures of the generator. These and other techniques will become apparent to those skilled in the art from the description herein.

The process of the present invention is preferably effected by feeding a solution of chlorate, which can include a metal chloride when used to a single chamber, combination generator-evaporator-crystallizer 10 via lines 12 and 14. The chlorate solution is maintained at the desired generator temperature by means of a heating and temperature control in a recycle recirculation system. Alternatively, heating means can be utilized within or about the generator-evaporator-crystallizer 10. Strong acid in an amount required to maintain the acid normality in a desired range in the generator are also fed to the generator-evaporator-crystallizer 10 via lines 14 and 16.

The unilocular generator-evaporator-crystallizer is operated under a reduced pressure of about 50 to 600 millimeters of mercury absolute and more preferably in the range of about 100 to 400 millimeters of mercury absolute. The heating means and temperature control system supply sufficient heat to the unilocular generator-evaporator-crystallizer to volatilize sufficient water within the generator to maintain the generator liquid level substantially constant by removing water of reaction and the excess water fed with chlorate, chloride and acid solutions. The feed rate and concentrations thereof regulate the desired reaction concentrations of chlorate, chloride and acid normality within the generator. The pressure is reduced to correspond to the boiling point of the reaction solution. Thus, the temperature used can be from 0° to about 95° centigrade. More preferably, a temperature of about 30° to 90° centigrade is used and most preferably, a temperature of about 40 to 85° centrigrade is used.

Chlorine and chlorine dioxide are produced in the reaction. These gases, diluted with water vapor, are removed from the reactor via line 18 and passed via line 20 to a chlorine dioxide and chlorine recovery system. A pressure reducing means is in communication via line 26 with the generator-evaporator-crystallizer 10. The water vapor being removed with the ClO₂ and Cl₂ is sufficient to dilute the chlorine dioxide to a safe concentration thereby eliminating any danger of explosive concentrations of chlorine dioxide.

In operating the generator under reduced pressure, circulation is effected by withdrawing a stream of liquor via line 22 by means of pump 24, passing it through a heating means and a temperature control system and returning it via line 14 to the generator. Thus, the reactor is maintained at the desired temperature to effect the volatilization of water along with the chlorine dioxide and chlorine generated at the desired pressure.

Having established the temperature-pressure operating conditions, the desired chlorate and chloride ratio is achieved by feeding the chlorate and chloride to the generator at a rate and concentration commensurate with the reaction. The concentration of chlorate ion in the generator can be maintained anywhere within a mole concentration of about 0.005 to just below the solubility limit which is about 3.5 molar at the higher temperatures. The concentration of chloride ion can also be maintained anywhere within a mole concentration of about 0.001 to just below the saturation point when a strong mineral acid is used in conjunction with hydrochloric acid as the reducing agent. Saturation of sodium chloride is about 3 molar, depending on the other ion concentrations. Most preferably, the chloride to chlorate mole ratio is about equal molar or within about 20 per cent of equal molar at about 2 to 3 normal acid and most preferably about 2.5 normal acid.

Having established the parameters of chlorate and chloride concentration, the amount of strong acid used can be determined. The concentration of acid desired is dependent on the rate of reaction desired, the operating temperature and the type of sulfate salt desired. Most economical use of sulfuric acid is effected by retaining the acid normality within the generator below about 4.4 thereby effecting the crystallization of primarily neutral sodium sulfate when sodium is the chlorate anion. At higher acid concentrations, such as above 4.5 an acid sulfate salt is produced. Such a higher acid concentration is sometimes desirable even with the loss of acid values in producing an acid sulfate, when a faster rate of reaction is required without the use of a catalyst. However, using a lower acid normality, a superior reaction efficiency is obtained by using a catalyst for the reaction. The increase in efficiency of ClO₂ production compensates adequately for any change in the overall reaction rate. The catalysts which are most effective are vanadium pentoxide, silver ions, manganese ions, dichromate ions and arsenic ions as well as mixtures thereof. Thus, the acid normality is normally from about 1 to 12 with about 4.5 to 12 being preferred for the production of an acid sulfate salt and a normality of 1 to about 4.4 producing a neutral sulfate salt.

Having established the parameters of acid, chlorate and chloride concentration, the generator is operated under the pressure and temperature conditions stated, thereby increasing the sodium and sulfate values in the reaction solution by further addition of reactants until a saturated condition is reached with respect to sodium and sulfate ions thereby precipitating a sodium sulfate salt. In the same manner, if HCl is the only strong acid utilized, sodium chloride is precipitated and with other alkali metals and alkaline earth metals, the corresponding metal chloride salt is precipitated. Furthermore, the saturation point with respect to sodium chloride and sodium sulfate may concur to form a mixed chloride sulfate salt.

Having set the parameters of acid concentration the type of sodium salt precipitated will be effected additionally by the particular generator operating temperature particularly when sodium is the cation. At operating temperatures above about 25° centigrade, an anhydrous sodium salt is precipitated. However, at temperatures below about 25° centigrade, one or a mixture of the various hydrated sodium sulfate salts are crystallized. Normally, the higher hydrates are crystallized at the lower temperatures. It is often desirable to effect the crystallization of a hydrate such as the mono or sesqui hydrate to thereby aid in the removal of substantial amount of water from the generator. Thus, it will readily become apparent to those skilled in the art that the particular parameters of the reaction can be readily selected to recover the desired type and form of sulfate salt as well as the quantity of the sulfate salt.

As the concentration of sodium and sulfate ions increases to the saturation point, sodium sulfate crystals begin to crystallize from the reaction solution. The crystals settle to the bottom of the reactor from which they may be withdrawn with a portion of mother liquor, via line 28, generally as a slurry, separated from the mother liquor and the mother liquor returned to the generator.

Although an inert gas is normally not required nor used in the present process to dilute the chlorine dioxide generated, some gas such as air, nitrogen or the like can be blown or drawn through the reactor to facilitate the evaporation of water from the generator. The use of an inert gas is particularly beneficial when operating below the boiling point of the reaction solution.

The present invention has been described with respect to a number parameters within the scope of the present invention about which the reaction is readily effected. However, this is not to be construed to mean that every possible combination of values from within the aforementioned operating ranges may be selected, as those skilled in the art will appreciate, to obtain the most desirable operating conditions. However, for every value in any given range there is a range of corresponding values which fall within the broad ranges within which the process is desirably practiced. For instance, low acidities such as below about one normal are preferably not used because, under these conditions, operation at the highest permissable temperature may result in too low a production rate of chlorine dioxide, chlorine and metal salt from a practical point of view. It is also to be noted that while the particular ratio of chloride to chlorate can be varied widely, such outer limits as wherein a large excess of chloride ion is used with respect to chlorate, may result in the production of more than the desired amount of chlorine along with the chlorine dioxide. Therefore, from a practical point of view, the mole ratio of chloride to chlorate in the feed solution to the reaction vessel is preferably between about 0.8 : 1 to 6 : 1 chloride to chlorate. However, in the extreme end of these ranges, under certain temperatures of reaction, particularly, low temperatures, sodium chlorate may be precipitated along with the alkali-metal sulfate. Thus, the most preferred ratio of the solution is within the mole ratio of about 1:1 to 1.6:1 chloride to chlorate.

The following examples illustrate certain preferred embodiments of the present invention. Unless otherwise indicated, all parts and percentages used herein are by weight and all temperature are in degrees centigrade.

EXAMPLE 1

The process utilized in this invention was effected utilizing a flow scheme as illustrated in the drawing to produce a gaseous mixture of chlorine dioxide and chlorine and a sodium sulfate salt. The reaction was effected by establishing a generator-evaporator-crystallizer temperature of about 75° to 79° centigrade at a pressure of about 200 millimeters of mercury absolute. The reactor was continuously fed with an aqueous solution of 4.22 molar sodium chlorate at a rate of about 400 parts per hour in addition to 294 parts per hour of 37 per cent aqueous hydrochloric acid and 50 per cent aqueous sulfuric acid at a rate of 252 parts per hour. A stream of generator liquor was continuously withdrawn from the reactor by means of a thermosiphon heat pump, heated to an elevated temperature and returned to the reactor thereby retaining the reactor temperature at the desired range.

Upon commencing the reaction, the concentration parameters were quickly established at a generator acidity of about 4.4 normal. The chlorine dioxide and chlorine produced in the reaction was withdrawn with diluting amounts of water vapor from the reactor and passed through a chlorine dioxide and chlorine recovery system. After operating the reaction for a period of time, the concentration of sodium and sulfate ions reached the saturation point and crystallization was observed in the reactor. The crystals settled to the bottom of the reactor as they formed from which they were withdrawn either continuously or periodically with a small portion of mother liquor. The crystals were separated from the mother liquor and the mother liquor was returned to the reactor. Analysis of the crystals formed indicated that they were primarily anhydrous neutral sodium sulfate with minor amounts of anhydrous sodium acid sulfafe.

The gases generated were analyzed for chlorine, hydrogen chloride, and chlorine dioxide. The loss of hydrogen chloride from the reactor was found to be negligible. The amount of chlorine dioxide produced was determined by absorption in a potassium iodide solution. Under the conditions of reaction, the gram atom per cent yield of chloride dioxide was 41.5.

In the same manner, potassium chlorate, lithium chlorate, calcium chlorate, rubidium chlorate and cesium chlorate as well as mixtures thereof are substituted for the sodium chlorate to obtain correspondingly good results.

EXAMPLE 2

This example illustrates the production of chlorine dioxide, chlorine and sodium acid sulfate by the present process. The process of Example 1 is followed using the same sodium chlorate and hydrogen chloride feed rates while increasing the sulfuric acid concentration in the reactor to an acid normality of about 10 normal. Under the same reaction conditions of temperature, sodium chlorate and hydrogen chloride concentrations, the rate of reaction is increased and the gram atom per cent yield of chlorine dioxide is also increased to about 45 per cent. Crystallization is again observed in the reactor after establishing the parameters of operation. The crystalline material is periodically or continuously withdrawn from the reactor, separated from the mother liquor and the mother liquor returned to the reactor. The crystals obtained are substantially anhydrous sodium acid sulfate.

EXAMPLE 3

This example illustrates the production of chlorine dioxide, chlorine and a hydrated sodium sulfate salt by the present process. The reaction was again effected according to Example 1 utilizing similar chlorate, hydrogen chloride and sulfuric acid feed rates to establish similar concentrations within the reactor and a generator acidity of about 4.4 normal. The pressure within the reactor is reduced to about 5 to 30 millimeters of mercury absolute, thus setting a reactor boiling temperature of about 20° to 25° centigrade. Chlorine dioxide and chlorine are again produced in the reaction with a correspondingly decrease in the rate of reaction but at a commensurable gram atom per cent yield of chlorine dioxide. The reaction efficiency for $ClO_2$ production can be increased by means of a catalyst for the reaction. Crystallization again occurs in the reactor as the saturation point is reached and the crystals formed are periodically or continuously removed from the reactor with a stream of mother liquor. The crystals are separated from the mother liquor and the mother liquor returned to the reactor. The crystals obtained are substantially monohydrated sodium sulfate crystals with minor amounts of monohydrated sodium acid sulfate and sodium sulfate sesquihydrate.

In the same manner, the method of Example 2 is operated at the parameters of temperature and pressure of Example 3 to obtain hydrated crystals of primarily sodium acid sulfate. In operating at the lower temperatures, substantial amounts of water are removed from the reaction generator by means of water of crystallization, thus reducing the amount of water to be removed by vaporization. Under conditions of low temperature and low acidity, the use of a catalyst is particularly beneficial to increase the efficiency of the reaction and the gram atom per cent yield.

EXAMPLE 4

This example illustrates the use of a mixture of hydrochloric acid and sodium chloride as the chloride reducing agents supplied to the reactor to thereby increase the production of sodium sulfate to obtain the desired sodium sulfate production commensurable with the requirements of a given pulping operation.

To increase the amount of sodium sulfate produced in Example 1 by 25 per cent only a partial substitution of sodium chloride for some of the hydrochloric acid is used. All operating conditions, including generator temperature, pressure and acidity are the same as those of Example 1. The reactor is fed an aqueous solution of 2.4 molar sodium chlorate, 0.6 molar sodium chloride at a rate of 169 moles per hour of sodium chlorate and 42.3 moles per hour of sodium chloride. An aqueous solution of 37 per cent hydrochloric acid is also fed to the reactor at a rate of 317 moles per hour.

Sulfuric acid at a 50 per cent concentration is fed to the reactor as the strong acid supplement at a rate of 216 moles per hour.

At the given feed rates, the same production rate of chlorine dioxide and chlorine as that of Example 1 is obtained with the amount of sodium sulfate produced being increased from the 85 moles per hour rate of Example 1 to 106 moles per hour in the present example.

What is claimed is:

1. In a continuous process for the production of chlorine dioxide, chlorine and an inorganic salt wherein a reducing agent is continuously introduced into an aqueous reaction solution maintained from about 1–12 normal in mineral acid and from 0.005 to about 3.5 molar in chlorate at a temperature between 30° to about 90° centigrade to produce chlorine dioxide and a solid inorganic salt, the improvement which comprises conducting said continuous process by introducing hydrochloric acid as the reducing agent into a unilocular zone containing said reaction solution under reduced pressure of from 50 to about 600 millimeters mercury absolute, wherein said pressure is coordinated with the temperature of the reaction solution to effect the evaporation of water from said aqueous reaction solution at a rate sufficient to maintain a substantially constant volume of reaction solution, whereby chlorine dioxide and chlorine are continuously generated and removed from said zone in admixture with said evaporated water and said inorganic salt is crystallized from said aqueous reaction solution in said unilocular zone and recovered.

2. The process of claim 1 wherein said hydrochloric acid is introduced in excess of that amount necessary to provide a stoichiometric quantity of reducing agent.

3. The process of claim 1 in which said mineral acid is sulfuric acid.

4. The process of claim 1 in which said mineral acid is a mixture of hydrochloric acid and sulfuric acid.

5. The process of claim 1 in which said inorganic salt is at least one member selected from the group consisting of a metal sulfate, bisulfate and chloride, said metal being the cation of said chlorate reactant.

6. The process of claim 5 in which said metal is an alkali metal.

7. The process of claim 1 in which the temperature of the reaction solution is from about 65° to about 85° centigrade and said pressure is from about 100 to about 400 millimeters mercury absolute.

* * * * *